United States Patent
Zhao et al.

(10) Patent No.: US 9,059,905 B2
(45) Date of Patent: *Jun. 16, 2015

(54) METHODS AND ARRANGEMENTS IN AN MPLS-TP NETWORK

(71) Applicant: Telefonaktiebolaget L M Ericsson (publ), Stockholm (SE)

(72) Inventors: Wei Zhao, Solna (SE); Loa Andersson, Johanneshov (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,134

(22) Filed: Nov. 14, 2013

(65) Prior Publication Data

US 2014/0140217 A1    May 22, 2014

Related U.S. Application Data

(63) Continuation of application No. 13/321,668, filed as application No. PCT/SE2009/050627 on May 29, 2009, now Pat. No. 8,611,353.

(51) Int. Cl.
*H04L 12/24*    (2006.01)
*H04L 12/751*    (2013.01)
(Continued)

(52) U.S. Cl.
CPC ............ *H04L 41/0677* (2013.01); *H04L 45/10* (2013.01); *H04L 45/26* (2013.01); *H04L 45/28* (2013.01); *H04L 45/304* (2013.01); *H04L 45/50* (2013.01); *H04L 45/54* (2013.01)

(58) Field of Classification Search
CPC ..... H04L 41/0677; H04L 45/10; H04L 45/26; H04L 45/54; H04L 45/28; H04L 45/50; H04L 45/304

USPC .................................................. 370/216–409
See application file for complete search history.

(56) References Cited

U.S. PATENT DOCUMENTS 5,659,540 A * 8/1997 Chen et al. .................... 370/249
5,793,976 A * 8/1998 Chen et al. .................... 709/224

(Continued)

FOREIGN PATENT DOCUMENTS

EP        1679842 A1    7/2006
EP        1863225 A1    12/2007

(Continued)

OTHER PUBLICATIONS

Boutros, et al., "Connection verification for MPLs Transport Profile LSP," Network Working Group, Internet Draft, Internet Engineering Task Force, Internet Society, Mar. 9, 2009, pp. 1-16, XP015060454.

(Continued)

*Primary Examiner* — Afsar M Qureshi
(74) *Attorney, Agent, or Firm* — Rothwell, Figg, Ernst & Manbeck, P.C.

(57) ABSTRACT

The present invention relates to methods and arrangements in an MPLS-TP network. comprising a plurality of interconnected routers configured for MPLS-TP, wherein at least a first router is defined as an originating Maintenance End Point, MEP, a second router is defined as a targeting MEP and the third router is defined as a Maintenance Intermediate Point, MIP. The basic idea of the present invention is to associate a table with each MIP and MEP, wherein the tables comprises information related to the MEPs of the MPLS-TP network and the information from the tables is inserted in the reply packets and forwarded packets. By using this information, the OAM packets can find the subsequent MIP or MEP and failure localization may be performed.

13 Claims, 4 Drawing Sheets

(51) Int. Cl.
*H04L 12/721* (2013.01)
*H04L 12/703* (2013.01)
*H04L 12/725* (2013.01)
*H04L 12/723* (2013.01)
*H04L 12/741* (2013.01)

(56) References Cited

U.S. PATENT DOCUMENTS

| | | | |
|---|---|---|---|
| 6,154,448 A * | 11/2000 | Petersen et al. | 370/248 |
| 7,315,510 B1 | 1/2008 | Owens et al. | |
| 8,611,353 B2 * | 12/2013 | Zhao et al. | 370/392 |
| 2004/0190446 A1 * | 9/2004 | Ansorge et al. | 370/228 |
| 2013/0148489 A1 * | 6/2013 | Boutros et al. | 370/216 |

FOREIGN PATENT DOCUMENTS

| | | |
|---|---|---|
| FR | 2906426 A1 | 3/2008 |
| WO | 9859521 A1 | 12/1998 |

OTHER PUBLICATIONS

Alcatel, "T-MPLS OAM Architecture and Requirements", Telecommunication Standardization Sector, Study Period 2005-2008, International Telecommunication Union, Jul. 17-28, 2006, pp. 1-4; XP017406932.

Extended European Search Report issued on Jul. 23, 2013 in corresponding European patent application No. 13 16 5615, 4 pages.

Boutros, S., et al., "Connection verification for MPLS Transport Profile LSP", Network Working Group, Internet Draft, Mar. 9, 2009, 17 pages.

Office Action issued on Mar. 26, 2014, in corresponding Chinese Patent Application No. 200980159718.2, 7 pages (English translation only).

Vigoureux, M. et al., "Requirements for OAM in MPLS Transport Networks" MPLS Working Group, Internet Draft, Nov. 28, 2008, 35 pages.

Kompella, K. et al., "Detecting Multi-Protocol Label Switched (MPLS) Data Plane Failures", Network Working Group, Feb. 2006, 101 pages.

Bocci, M. et al., "A Framework for MPLS in Transport Networks", MPLS Working Group, Internet Draft, Nov. 27, 2008, 55 pages.

"Draft Standard for Local and Metropolitan Area Networks—Amendment 5 to 802.1Q Virtual Bridged Local Area Networks: Connectivity Fault Management", IEEE P802.1ag/D8, Feb. 8, 2007, 234 pages.

Bocci, M. et al., "MPLS Generic Associated Channel", MPLS Internet Draft, Jan. 6, 2009, 31 pages.

* cited by examiner

METHODS AND ARRANGEMENTS IN AN MPLS-TP NETWORK

CROSS-REFERENCE TO RELATED APPLICATIONS

This application is a continuation of application Ser. No. 13/321,668 (now U.S. Pat. No. 8,611,353), which is a 35 U.S.C. §371 National Phase Entry Application from PCT/SE2009/050627, filed May 29, 2009, designating the United States. The above identified applications and publications are incorporated by reference.

TECHNICAL FIELD

The present invention relates to methods and arrangements in an MPLS-TP (Multi protocol Label Switching-Transport Profile) network. In particular, it relates to failure localization in the MPLS-TP network.

BACKGROUND

In computer networking and telecommunications, Multi protocol Label Switching (MPLS) refers to a mechanism which directs and transfers data between Wide Area Networks (WANs) nodes with high performance, regardless of the content of the data. MPLS makes it easy to create "virtual links" between nodes on the network, regardless of the protocol of their encapsulated data.

MPLS is a highly scalable, protocol agnostic, data-carrying mechanism. In an MPLS network, data packets are assigned labels. Packet-forwarding decisions are made solely on the contents of this label, without the need to examine the packet itself. This allows one to create end-to-end circuits across any type of transport medium, using any protocol. The primary benefit is to eliminate dependence on a particular Data Link Layer technology, such as ATM, frame relay, SONET or Ethernet, and eliminate the need for multiple Layer 2 networks to satisfy different types of traffic. MPLS belongs to the family of packet-switched networks.

The development of MPLS-TP has been driven by the carriers needing to evolve SONET/SDH networks to support packet based services and networks, and the desire to take advantage of the flexibility and cost benefits of packet switching technology.

MPLS-TP is a profile of MPLS which will be designed for use as a network layer technology in transport networks. This profile specifies the specific MPLS characteristics and extensions required to meet transport requirements. One important characteristics of MPLS-TP is that it is designed to work regardless of the existence of IP. This introduces some OAM (Operation and Maintenance) handling problems, such as failure localization. Because the current MPLS failure localization mechanism relies on that IP works.

As MPLS deployments increase and the traffic types they carry increase, the ability of service providers to monitor LSPs (Label Switched Paths) and quickly isolate MPLS forwarding problems is critical to their ability to offer services. The MPLS Embedded Management—LSP Ping/Traceroute can help the service providers to do this.

Hence one major OAM task is to isolate or localize a network failure. In MPLS, this task is usually done by LSP Ping/Traceroute. However, this solution relies on the existence of IP, which means that it will only work for IP enabled MPLS network. MPLS-TP, on the other hand, has as a prerequisite that it should work regardless of the existence of IP. So the traditional LSP Ping/Traceroute will not work in MPLS-TP context.

SUMMARY

The object of the present invention is to identify the functions needed in the functional entities to achieve failure localization and how the OAM packets should be processed in terms of failure localization.

According to a first aspect of the present invention a method for failure localization in an MPLS-TP network is provided. The network comprises a plurality of interconnected routers configured for MPLS-TP, wherein at least a first router is defined as an originating maintenance End Point, MEP, and a second router is defined as a targeting MEP such that OAM packets are sent from the originating MEP towards the targeting MEP. In the method, a table is associated with each MEP, wherein the table comprises information related to the MEPs of the MPLS-TP network. OAM packets are issued from the originating MEP towards the targeting MEP, and information is inserted from the table into the issued OAM packets to enable identification of a subsequent MEP or MIP. Upon reception of an OAM packet, a reply packet is issued at the receiving router towards the originating MEP, and information is inserted into the reply packet from the table associated with the router issuing the reply packet such that the originating MEP can analyze the reply packet for failure localization.

According to a further aspect at least a third router is defined as a MIP and the method comprises the further step of sending an OAM packet from the originating MEP via the at least one MIP towards the targeting MEP. The OAM packet comprises the identity of the label switched path towards the targeting MEP and, based on information from the table associated with the originating MEP, the number of hops to the subsequent MIP or MEP an identity of the originating MEP. At each MIP or MEP receiving said OAM packet the following steps are performed: generating a reply packet towards the originating MEP, inserting the identity of the label switched path towards the originating MEP, based on information from the table associated with the first MIP, inserting the number of hops to the originating MEP into the reply packet, the identity of said first MIP in said reply packet and the identity of the originating MEP. Further, at each MIP the further steps are performed: forwarding said OAM packet towards the targeting MEP, updating the number of hops to the subsequent MIP or MEP based on information from the table, and determining the location of a failure by analyzing the identity of the MIP/MEP of the reply packets at the originating MEP.

According to a yet further aspect a router for failure localization of an MPLS-TP network is provided. The MPLS-TP network comprises a plurality of interconnected routers configured for MPLS-TP, wherein at least a first router is defined as an originating MEP and a second router is defined as a targeting MEP. The router comprises a table including information relating to the MEPs of the MPLS-TP network, a receiver for receiving OAM packets, a transmitter for sending OAM reply packets and for issuing and regenerating OAM packets. It further comprises a processor for inspecting OAM request packets, for retrieving information from the table for inserting the retrieved information into the reply packets and the regenerated packets.

An advantage with embodiments of the present invention is that the solution is needed for transport providers who want to use their existing network while providing packet based services to their customers.

A further advantage existing with embodiments with the present invention is that they do not require any changes to any standards. The new functionalities do not change any semantics or interfere with any existing implementations. The invention can simply be an independent module which can be loaded into the network devices only when needed.

DETAILED DESCRIPTION

Figure 1:
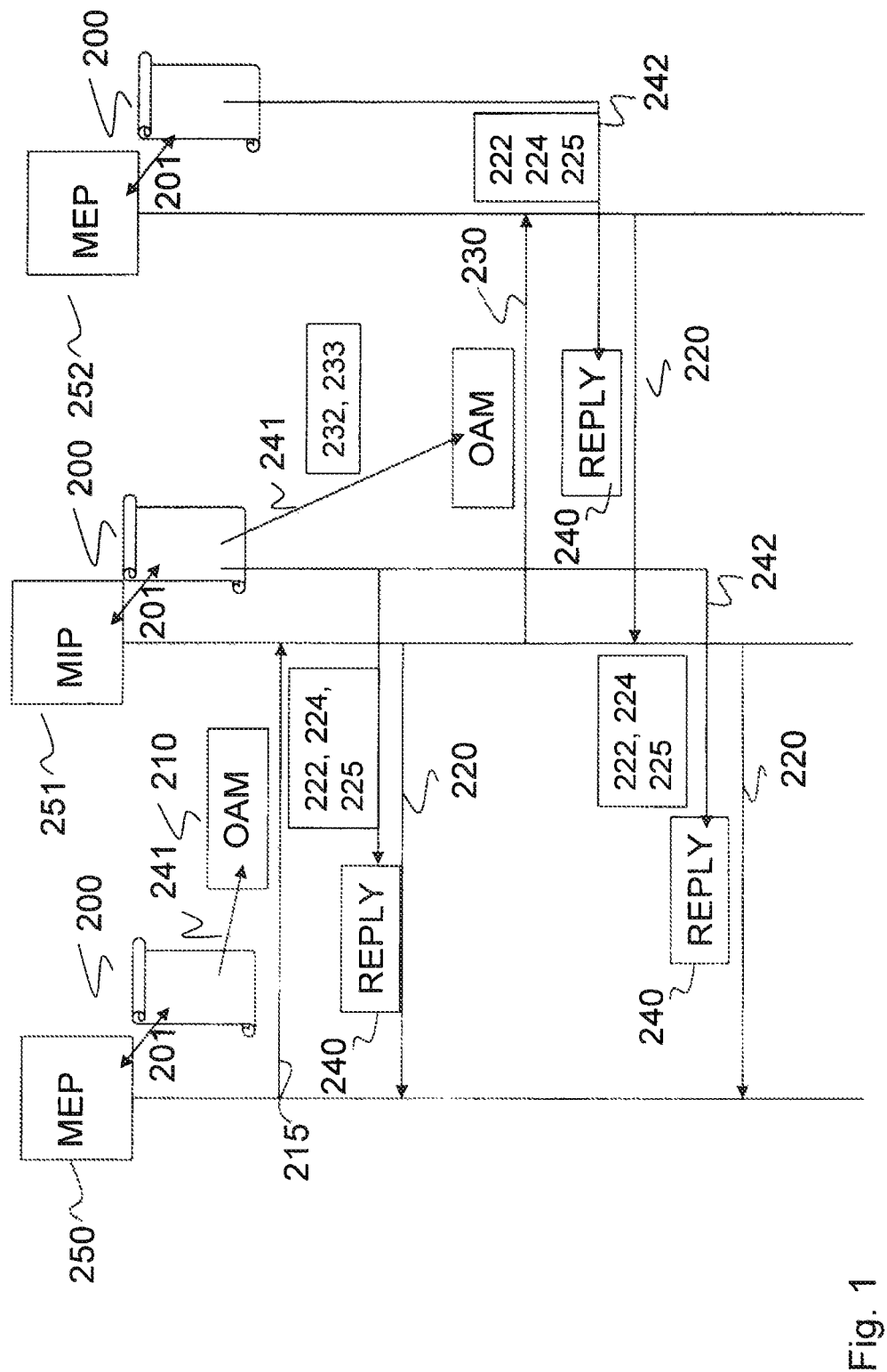
FIG. 1 illustrates a system according to some embodiments.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means, units and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

For Ethernet network OAM, IEEE 802.1ag (IEEE 802.1ag, Connectivity Failure Management) defines two functional entities: Maintenance End Point (MEP) and Maintenance Intermediate Point (MIP), and it also defines three message types: Connectivity Check Message (CCM), Link Trace (LT) and LoopBack (LB) messages. In short, MEP and MIP operate on different maintenance association levels in a nested structure. MEP is the entity that issues CCM, LT or LB messages, while MIP will either passively transmit, or reply back, the messages sent by MEP depending on what OAM message is sent. MPLS-TP OAM must have similar functionalities in order to fulfil the goal of service management. MPLS-TP uses VCCV defined in MPLS OAM as the CCM correspondence, but since MPLS Ping and Traceroute which correspond to LT and LB in Ethernet may not always be applicable in MPLS-TP contexts, new solutions are needed in the MPLS-TP network.

Accordingly, in order for the MPLS-TP OAM to be able to achieve failure localization in a similar way as in Ethernet OAM, in the point to point case, the MPLS-TP mechanism according to embodiments of the present invention has to be able to perform the following tasks:

Send OAM packets from one originating MEP targeting at the targeting MEP at the other end of the LSP.

MIPs located in the middle of the ISP need to intersect, inspect, reply and regenerate this OAM packet.

It is however difficult to achieve the abovementioned two tasks at the same time in MPLS-TP. The reason being that if an OAM packet is targeted towards a MEP, the MIPs in the middle will simply forward the packet based on the ISP label on top of the label stack without further checking the packet itself.

To solve this problem, the IETF Draft, MPLS Generic Associated Channel has proposed to use the TTL (Time To Live) field in the MPLS LSP label to force the MIP to react to a specific OAM packet. However, the IETF draft does not provide a solution as for how an OAM packet should be processed and what new functionalities are needed in the MPLS-TP OAM framework.

This is solved by the present invention and described in conjunction with FIG. 1.

The basic idea of the present invention is to associate a table with each MIP and MEP, wherein the tables comprises information related to the MEPs of the MPLS-TP network and the information from the tables is inserted in the reply packets and forwarded packets. By using this information, the OAM packets can find the subsequent MIP or MEP and failure localization may be performed.

To simplify the description, following terminologies are defined and used in the specification below:

An OAM request Packet is the OAM packet that checks the network status, for instance in Ethernet case. The OAM request packet can be CCM, LT, LB, and in MPLS-TP case, it can be VCCV, or an OAM packet as defined in accordance with embodiments of the present invention, etc.

An OAM Reply Packet is the OAM packet generated and sent as a reply to an OAM request packet, for instance LT-reply, LB-reply, etc.

An originating MEP is the MEP that generates and sends an OAM request packet.

A targeting MEP is the destination MEP which the originating MEP is sending OAM packets to.

According embodiments of the present invention, two new functionalities are identified and specified. During the MEP/MIP Setup phase, when setting up MEPs and MIPs for a given LSP, a vector illustrated as a table shown in FIG. 1 needs to be installed and configured in each MEP and MIP.

In order to describe the embodiments of the present invention a first example is provided. In this example a point-to-point LSPs of MPLS-TP configuration is considered. FIG. 1 depicts a typical OAM setup in an MPLS-TP network comprising an originating MEP 250, a MIP 251 and a targeting MEP 252. According to the embodiments of the present invention, a table 200 is associated with each MIP and MEP. The table 200 comprises at least: an identity of the originating MEP, an identity of a label switch path from the originating MEP towards the targeting MEP also referred to as Forward-LSP, an identity of a label switch path from the targeting MEP towards the originating MEP also referred to as Reply-LSP, the number of hops to a subsequent MIP or MEP, the number of hops to the originating MEP, and identity of the MIP/MEP which the table is associated with.

In addition, the table may also comprise a maintenance entity identity which identifies which Maintenance Entity (ME) all the MEPs/MIPs belong to. Hence, the ME is used to associate the failure and also the whole OAM with the correct level, since OAM is a nested structure.

Failure localization OAM packets 210 are created and transmitted in the network to localize the failure. An example of such a failure localization OAM packet 210 is an LT packet which is processed as follows:

In a first step 101, a MEP 250 issues 215 an LT packet 210. Depending on the nature of the Ethernet network, the destination address of this LT packet can be either a multicast address, or a group address, in both cases, the targeting MEP (s) 252 on the other end of the connection is in the same ME level. The number of hops to the next MIP or MEP and the forward LSP are inserted in the LT packet 210. In addition, the ME identity and the MEP identity are also inserted in the LT packet. This information is retrieved from the table associated with the originating MEP 250.

In a second step 102, the first MIP on the path intersects this LT packet 210. The first MIP replies 220 back to the originating MEP 250 with a reply packet by inserting the identity of a label switch path 222 from the targeting MEP towards the originating MEP and the number of hops 224 to the originating MEP. Also, the ME identity and the originating MEP identity are inserted in the reply packet. Further, the first MIP resends 230 the packet 210 on the path to the next MIP 251 towards the targeting MEP(s) 252 and inserts the identity of a label switch path from the originating MEP towards the targeting MEP 232, the number of hops 233 to a subsequent MIP or MEP, the ME identity and the identity of the originating MEP. The MIPs are configured to react on packets originating from the originating MEP, therefore the identity of the originating MEP is inserted.

Subsequent MIPs will repeat the above process until the LT packet reaches the targeting MEP(s). If the original MEP does not receive the expected reply packet from a given MIP or MEP, it will then be able to localize the failure by identifying the last node where the LT packet arrived. Accordingly, a failure is detected when an MEP is expecting a reply packet from a specific MIP or MEP and does not receive it, the MEP will know there is a failure somewhere in the network.

To locate the failure, the MEP checks the MEP/MIP ID in the received reply packet and the expected but not received reply packet, for instance, a MEP may expect reply from MIP1, MIP2, MIP3 and MEP5, and if it receives reply from MIP1 and MIP2, but not MIP3 and MEP5, then it knows MIP3 is the location where failure occurs.

Figure 2:
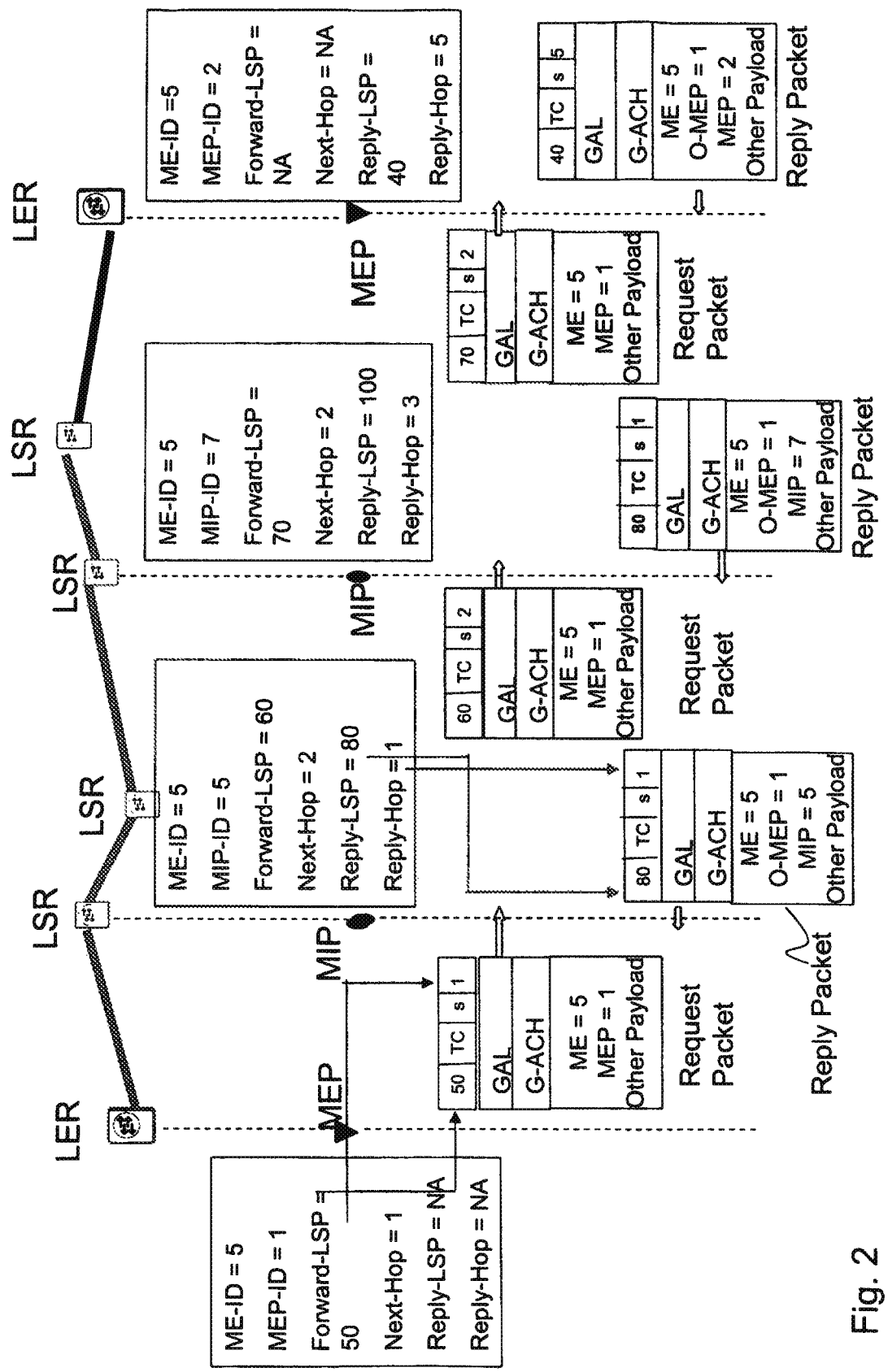
FIG. 2 illustrates tables associated with MIP/MEP.

A further example of the failure localization procedure is described below in conjunction with FIG. 2. In FIG. 2, the tables associated with each MIP/MEP is illustrated and the content of the reply (referred to as FL reply packet) and regenerated packets (referred to as FL request packet).

When the originating MEP issues the OAM request packet for failure localization, the targeting MEP is hidden in the LSP itself. The Next-Hop value, retrieved from the table associated with the originating MEP, in the originating MEP indicates the value of the TTL field of the OAM request packet. That implies that when the OAM request packet arrives at this MEP's neighbouring MEP or MIP, the TTL field will become 1, so the receiving MIP/MEP will react to the packet.

When a MIP receives an OAM request packet with TTL field is 1, it will perform the following:

Generate an OAM reply packet back to the original MEP by using the Reply-LSP as LSP label, and the reply-hop of the associated table will provide the correct TTL value to make sure that the reply packet reaches the originating MEP. The MEP-ID of the originating MEP will also be included in the reply packet.

Regenerate the OAM request packet by replacing the TTL field of the receiving packet with a value from the Next-Hop of the table, which will make sure that the packet will be processed by the next MIP/MEP, and that the next MIP will forward the packet.

If a MEP receives the OAM request packet, it will send a reply back to the original MEP without regenerating or forwarding the packet.

The originating MEP, upon receiving an OAM reply packet, will check that the MEP-ID included in the reply packet is identical to the identity of the originating MEP to make sure this is the response to its own request packet.

It should be noted that FIG. 2 is based on the assumption that the LSRs (Label Switched Router) where MIPs reside swap to the same LSP labels during forwarding.

Figure 3:
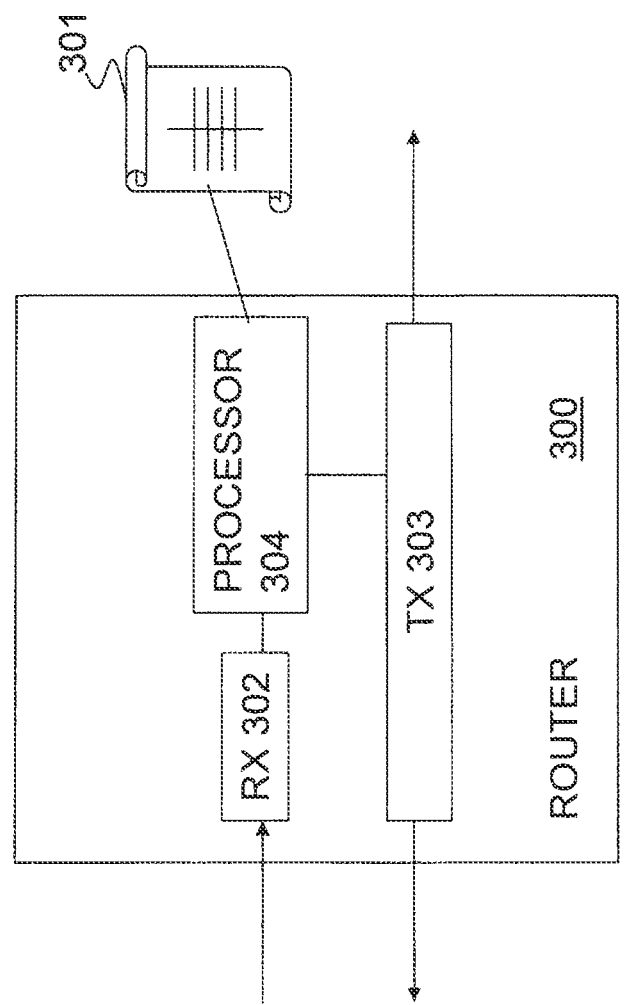
FIG. 3 illustrates a router according to some embodiments.

Turning now to FIG. 3, showing a router 300 of an MPLS-TP network comprising according to embodiments of the present invention a table 301, a receiver 302 for receiving OAM request packets, a transmitter 303 for sending OAM reply packets and for regenerating the received OAM request packets, and a processor 304 for inspecting OAM request packets, for retrieving information from MIP/MEP and for inserting the retrieved information into the reply and regenerated packets.

The processor 304 is configured to insert the identity of the label switched path towards the targeting MEP and the number of hops to the subsequent MIP or MEP in an OAM packet generated at the router based on information of the table. Moreover, the processor is configured to insert the identity of the label switched path towards the originating MEP, and based on the information of the table, the number of hops to the originating MEP, the identity of the router and the identity of the originating MEP into the reply packet. In order to determine whether a received OAM packet is intended for the router, the processor of the router is configured to inspect the received OAM packet by comparing a value in the TTL field with information of the table. For a reply packet, if the number of hops to the originating MEP is zero, the router receiving the reply packet is the originating MEP. For an OAM packet, if the number of hops to a subsequent MIP or MEP is zero, the router receiving the OAM packet is the MIP or MEP that the OAM packet is intended for. The router can be configured to act as an originating MEP, targeting MEP or MIP.

Figure 4:
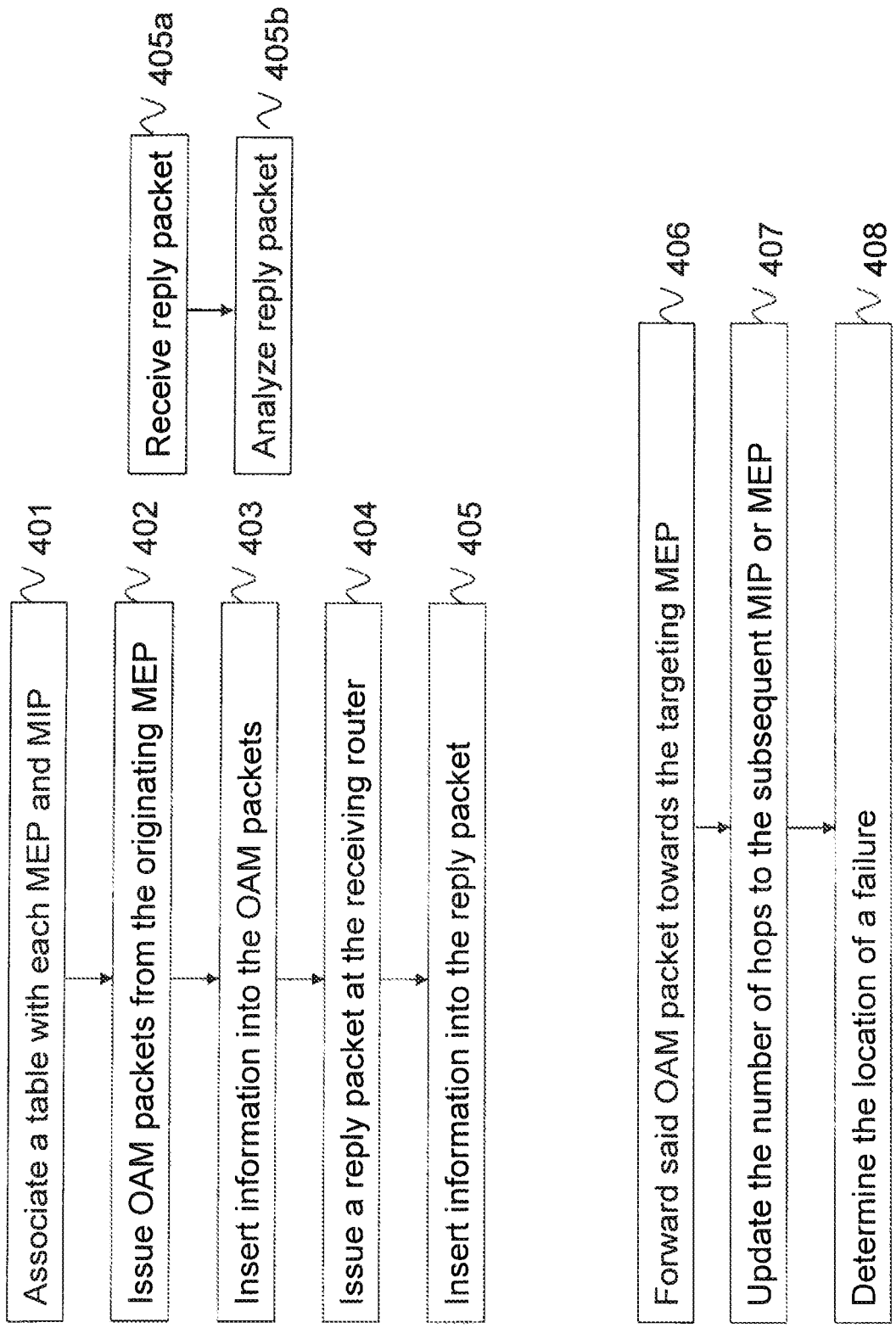
FIG. 4 is a flow chart illustrating a process according to some embodiments.

FIG. 4 illustrates flowcharts of the methods implemented in the MEP and MIP s according to the embodiments of the present invention. In the method a table is associated 401 with each MEP or MIP, wherein the table comprises information related to the MEPs of the MPLS-TP network. OAM packets are issued 402 from the originating MEP towards the targeting MEP and information from the table is inserted 403 into the issued OAM packets to enable identification of a subsequent MEP or MIP. Upon reception of an OAM packet, a reply packet is issued 404 at the receiving router towards the originating MEP, and information from the table associated with the router issuing the reply packet is inserted 405 into the reply packet such that the originating MEP can receive 405*a* and analyze 405*b* the reply packet for failure localization.

The issued OAM packet may comprise the identity of the label switched path towards the targeting MEP and, based on information from the table associated with the originating MEP, the number of hops to the subsequent MIP or MEP, the MIP/MEP identity and the ME identity.

At each MIP or MEP receiving said OAM packet the following steps are performed:

403. Generate a reply packet towards the originating MEP.

404. Insert (222) the identity of the label switched path towards the originating MEP and based on information from the table associated with the first MIP, insert the number of hops to the originating MEP into the reply packet, the identity of said first MIP in said reply packet, the identity of the originating MEP, and the ME identity.

If the receiving router is a MIP the further steps are performed:

405. Forward said OAM packet towards the targeting MEP.

406. Update the number of hops to the subsequent MIP or MEP based on information from the table.

407. Determine the location of a failure by analyzing the identity of the MIP/MEP of the reply packets at the originating MEP.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for failure localization in a Multiple Protocol Label Switching-Transport Profile (MPLS-TP) network comprising a plurality of interconnected routers configured for MPLS-TP, wherein at least a first router is defined as an originating Maintenance End Point (MEP), and a second router is defined as a targeting MEP such that OAM packets are sent from the originating MEP towards the targeting MEP, the method comprising:
 associating information related to MEPs of the MPLS-TP network with each MEP;
 issuing OAM packets from the originating MEP towards the targeting MEP;
 inserting into the issued OAM packets some information from the information related to the MEPs of the MPLS-TP network to enable identification of a MEP or Maintenance Intermediate Point (MIP);
 upon reception of a first OAM packet at a receiving router, issuing a reply packet at the receiving router towards the originating MEP; and
 inserting into the reply packet some information from the information related to the MEPs of the MPLS-TP network, which information is associated with said receiving router issuing the reply packet, such that the originating MEP can analyze the reply packet for failure localization, wherein
 the information related to the MEPs of the MPLS-TP network comprises at least an identity of a label switch path from the originating MEP towards the targeting MEP, an identity of a label switch path from the targeting MEP towards the originating MEP, a number of hops to a subsequent MIP or MEP and a number of hops to the originating MEP, an identity of the originating MEP, a maintenance entity (ME) identity which the MEPs and/or MIPs belong to, an identity of the MEP/MIP which the information related to the MEPs of the MPLS-TP network is associated with,
 at least a third router is defined as a MIP, and
 the method further comprises:
 sending a second OAM packet from the originating MEP via the at least one MIP towards the targeting MEP, wherein the second OAM packet comprises the identity of the label switched path towards the targeting MEP and, based on some information from the information related to the MEPs of the MPLS-TP network, which information is associated with the originating MEP, the number of hops to the subsequent MIP or MEP, and an identity of the originating MEP, at each MIP or MEP receiving said second OAM packet the following steps are performed: i) generating a reply packet towards the originating MEP, and ii) inserting the identity of the label switched path towards the originating MEP, based on some information from the information related to the MEPs of the MPLS-TP network, which information is associated with the first MIP, inserting the number of hops to the originating MEP into the reply packet, the identity of said first MIP in said reply packet and the identity of the originating MEP, and at each MIP the further steps are performed: i) forwarding said second OAM packet towards the targeting MEP, and ii) updating the number of hops to the subsequent MIP or MEP based on some information from the information related to the MEPs of the MPLS-TP network, and
 determining the location of a failure by analyzing the identity of the MIP/MEP of the reply packets at the originating MEP.

2. The method according to claim 1, wherein the number of hops to the subsequent MIP or MEP, is carried in the Time-to-Live (TTL) field of the first OAM packet.

3. The method according to claim 2, wherein the number of hops to the originating MEP is carried in the TTL field of the reply packet.

4. A method in a first router for failure localization in an MPLS-TP network comprising a plurality of interconnected routers configured for MPLS-TP, wherein the first router is defined as an originating maintenance End Point (MEP), and a second router is defined as a targeting MEP such that OAM packets are sent from the originating MEP towards the targeting MEP, the method comprising:
 obtaining information related to MEPs of the MPLS-TP network;
 issuing OAM packets from the originating MEP towards the targeting MEP;
 inserting some information from the information related to the MEPs of the MPLS-TP network into the issued OAM packets to enable identification of a subsequent MEP or Maintenance Intermediate Point, MIP;
 receiving reply packets from the subsequent MEP or MIPs comprising an identification the reply packet is intended for the originating MEP; and
 analyzing the reply packets for failure localization, wherein
 the information related to the MEPs of the MPLS-TP network comprises at least an identity of a label switch path from the originating MEP towards the targeting MEP, an identity of a label switch path from the targeting MEP towards the originating MEP, a number of hops to a subsequent Maintenance Intermediate Point (MIP) or MEP and a number of hops to the originating MEP, an identity of the originating MEP, a maintenance entity (ME) identity which the MEPs and/or MIPs belong to, an identity of the MEP which the information related to the MEPs of the MPLS-TP network is associated with,
 at least a third router is defined as a MIP, and
 the issuing step comprises: sending an OAM packet from the originating MEP via the at least one MIP towards the targeting MEP, wherein the OAM packet comprises the identity of the label switched path towards the targeting MEP and, based on some information from the information related to the MEPs of the MPLS-TP network, which information is associated with the originating MEP, the number of hops to the subsequent MIP or MEP and an identity of the originating MEP.

5. The method according to claim 4, wherein the number of hops to the subsequent MIP or MEP, is carried in the Time-to-Live (TTL) field of the OAM packet.

6. The method according to claim 4, wherein the number of hops to the originating MEP is carried in the Time-to-Live (TTL) field of the reply packet.

7. A method in a second router for failure localization in an MPLS-TP network comprising a plurality of interconnected routers configured for MPLS-TP, wherein at least a first router is defined as an originating Maintenance End Point (MEP) and the second router is defined as a targeting MEP, the method comprising:

associating information related to MEPs of the MPLS-TP network and an indication that the second router is the targeting MEP with the targeting MEP;

receiving OAM packets from the originating MEP;

upon reception of the OAM packet, issuing a reply packet towards the originating MEP; and inserting into the reply packet some information from the information related to the MEPs of the MPLS-TP network and the indication that the second router is the targeting MEP, such that the originating MEP can analyze the reply packet for failure localization, wherein the information related to the MEPs of the MPLS-TP network and the indication that the second router is the targeting MEP comprise at least an identity of a label switch path from the originating MEP towards the targeting MEP, an identity of a label switch path from the targeting MEP towards the originating MEP, a number of hops to a subsequent Maintenance Intermediate Point (MIP) or MEP which indicates that an OAM packet is indented for the second router and a number of hops to the originating MEP, an identity of the originating MEP, a maintenance entity (ME) identity which the MEPs and/or MIPs belong to, an identity of the MEP which the information related to the MEPs of the MPLS-TP network and the indication that the second router is the targeting MEP are associated with, at least a third router is defined as a MIP, the receiving step further comprises receiving OAM packets from the originating MEP via the MIP, and the issuing step further comprises, upon reception of the OAM packet, issuing a reply packet towards the originating MEP via the MIP, wherein the reply packet comprises the identity of the label switched path from the targeting MEP towards the originating MEP and the inserted information comprises the number of hops to the originating MEP, the identity of the originating MEP and the identity of the Targeting MEP.

8. The method according to claim 7, wherein the number of hops to the subsequent MIP or MEP, is carried in the Time-to-Live (TTL) field of the OAM packet.

9. The method according to claim 7, wherein the number of hops to the originating MEP is carried in the Time-to-Live (TTL) field of the reply packet.

10. A method in a third router for failure localization in an MPLS-TP network comprising a plurality of interconnected routers configured for MPLS-TP, wherein at least a first router is defined as an originating Maintenance End Point (MEP), a second router is defined as a targeting MEP, and the third router is defined as a Maintenance Intermediate Point (MIP), the method comprising:

associating information related to MEPs of the MPLS-TP network with the MIP;

receiving an OAM packet from the originating MEP, wherein the packet comprising an indication that the OAM packet is intended for the third router;

upon reception of the OAM packet, issuing a reply packet towards the originating MEP;

inserting into the reply packet some information from the information related to the MEPs of the MPLS-TP network, which information is associated with the router issuing the reply packet, such that the originating MEP can analyze the reply packet for failure localization;

regenerating the received OAM packet;

inserting into the regenerated OAM packet some information from the information related to the MEPs of the MPLS-TP network, which information is associated with the MIP, such that subsequent MIPs and/or MEPs can issue reply packets and regenerate the OAM packets; and forwarding the regenerated OAM packet towards the targeting MEP, wherein the information related to the MEPs of the MPLS-TP network comprises at least an identity of a label switch path from the originating MEP towards the targeting MEP, an identity of a label switch path from the targeting MEP towards the originating MEP, a number of hops to a subsequent MIP or MEP indicating that the OAM packet is intended for the third router and a number of hops to the originating MEP, an identity of the originating MEP, a maintenance entity (ME) identity which the MEPs and/or MIPs belong to, and an identity of the MIP which the information related to the MEPs of the MPLS-TP network is associated with, the received OAM packet comprises the identity of the label switched path towards the targeting MEP and the number of hops to the subsequent MIP or MEP indicating that the OAM packet is intended for the third router and an identity of the originating MEP, the information inserted into the reply packet comprises the identity of the label switched path towards the originating MEP, the number of hops to the originating MEP, the identity of the MIP and the identity of the originating MEP, and the information inserted into the regenerated OAM packet comprises an identity of a label switch path from the originating MEP towards the targeting MEP and the number of hops to the subsequent MIP or MEP.

11. A router for failure localization of an MPLS-TP network comprising a plurality of interconnected routers configured for MPLS-TP, wherein at least a first router is defined as an originating Maintenance End Point (MEP), and a second router is defined as a targeting MEP, the router comprising:

information relating to MEPs of the MPLS-TP network;

a receiver for receiving OAM packets;

a transmitter for sending OAM reply packets and for issuing and regenerating OAM packets; and a processor for: inspecting OAM request packets, retrieving some information from the information related to the MEPs of the MPLS-TP network, and inserting the retrieved information into the reply and the regenerated packets, wherein the information related to the MEPs of the MPLS-TP network comprises at least an identity of a label switch path from the originating MEP towards the targeting MEP, an identity of a label switch path from the targeting MEP towards the originating MEP, the number of hops to a subsequent Maintenance Intermediate Point (MIP) or MEP and the number of hops to the originating MEP, a maintenance entity (ME) identity which the MEPs and/or MIPs belong to, an identity of the MEP/MIP which the information related to the MEPs of the MPLS-TP network is associated with, and the processor is configured to insert the number of hops to the subsequent MIP or MEP and an identity of the originating MEP in an OAM packet generated at the router based on the information related to the MEPs of the MPLS-TP network.

12. The router according to claim 11, wherein the processor is configured to insert the identity of the label switched path towards the originating MEP, and based on the information related to the MEPs of the MPLS-TP network, the number of hops to the originating MEP, the identity of the router and the identity of the originating MEP into a reply packet.

13. The router according to claim 11, wherein the processor is configured to inspect a received OAM packet by comparing a value in the Time-to-Live (TTL) field with the information related to the MEPs of the MPLS-TP network to determine whether the OAM packet is intended for the router.

\* \* \* \* \*

UNITED STATES PATENT AND TRADEMARK OFFICE
CERTIFICATE OF CORRECTION

PATENT NO. : 9,059,905 B2
APPLICATION NO. : 14/080134
DATED : June 16, 2015
INVENTOR(S) : Zhao et al.

It is certified that error appears in the above-identified patent and that said Letters Patent is hereby corrected as shown below:

Title Page (57), under "ABSTRACT", in Column 2, Line 2, delete "network. comprising" and insert -- network comprising --, therefor In the Specification In Column 3, Line 66, delete "ISP" and insert -- LSP --, therefor.

In Column 4, Line 4, delete "ISP" and insert -- LSP --, therefor.

Signed and Sealed this
Twenty-third Day of February, 2016

Michelle K. Lee
*Director of the United States Patent and Trademark Office*